United States Patent
Raghunathan et al.

(10) Patent No.: US 10,798,706 B1
(45) Date of Patent: Oct. 6, 2020

(54) METHOD AND SYSTEM FOR OPERATION OF NEARBY ACCESS NODES ON A COMMON WIDEBAND CARRIER AND ON DIFFERENT RESPECTIVE NARROWBAND CARRIERS WITHIN THE WIDEBAND CARRIER

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 127 days.

(21) Appl. No.: 16/166,537

(22) Filed: Oct. 22, 2018

(51) Int. Cl.
*H04W 4/00* (2018.01)
*H04W 72/04* (2009.01)
*H04L 29/08* (2006.01)
*H04W 56/00* (2009.01)

(52) U.S. Cl.
CPC ......... *H04W 72/0453* (2013.01); *H04L 67/12* (2013.01); *H04W 56/002* (2013.01)

(58) Field of Classification Search
CPC .. H04W 72/0453; H04W 56/002; H04L 67/12
See application file for complete search history.

(56) References Cited

U.S. PATENT DOCUMENTS

| | | | |
|---|---|---|---|
| 8,498,253 B2 | 7/2013 | Krause et al. | |
| 10,075,851 B1 | 9/2018 | Marupaduga et al. | |
| 2015/0003348 A1* | 1/2015 | Ishii | H04W 48/12 370/329 |
| 2015/0018002 A1* | 1/2015 | Touag | H04W 72/0426 455/454 |
| 2015/0215852 A1* | 7/2015 | Gou | H04W 52/0206 455/434 |
| 2017/0257772 A1 | 9/2017 | Zhou et al. | |
| 2017/0332286 A1* | 11/2017 | Lepp | H04W 36/0022 |
| 2019/0020436 A1* | 1/2019 | Suzuki | H04J 11/0079 |
| 2019/0150151 A1* | 5/2019 | Nader | H04W 72/0453 370/329 |

OTHER PUBLICATIONS

Huawei, R1-156924, 3GPP TSG RAN WG1 Meeting #83 R1-156924 Anaheim, USA, Nov. 15-22, 2015, "Analysis of Channel Raster Impact on NB-IoT" (Year: 2015).*

* cited by examiner

*Primary Examiner* — Maharishi V Khirodhar

(57) ABSTRACT

In a wireless communication system including a group of base stations, the base stations are all configured to operate on a common wideband carrier, and each base station is further configured to operate on a narrowband carrier defined as a guest carrier within the frequency range of the wideband carrier, with each base station's narrowband carrier being non-overlapping in frequency with each other base station's narrowband carrier. Further, each base station could be configured to avoid allocation of air-interface resources on the common wideband carrier that would overlap in frequency with the narrowband carrier on which any other base station of the group is configured to operate within the wideband carrier.

20 Claims, 5 Drawing Sheets

METHOD AND SYSTEM FOR OPERATION OF NEARBY ACCESS NODES ON A COMMON WIDEBAND CARRIER AND ON DIFFERENT RESPECTIVE NARROWBAND CARRIERS WITHIN THE WIDEBAND CARRIER

BACKGROUND

A cellular wireless network typically includes a number of base stations or other access nodes, referred to without limitation as Node-Bs (NBs), that are configured to provide wireless coverage areas, such as cells and cell sectors, in which wireless communication devices (WCDs) such as cell phones, tablet computers, machine-type-communication devices, tracking devices, embedded wireless modules, and/or other wirelessly equipped communication devices (whether or not user operated) can operate. Each NB could be coupled with a core network that provides connectivity with various application servers and/or transport networks, such as the public switched telephone network (PSTN) and/or the Internet for instance. With this arrangement, a WCD within coverage of the cellular network could engage in air interface communication with a NB and could thereby communicate via the NB with various application servers and other entities.

Such a network could operate in accordance with a particular radio access technology, with communications from the NBs to WCDs defining a downlink or forward link and communications from the WCDs to the NBs defining an uplink or reverse link.

In accordance with the radio access technology, each coverage area could operate on one or more carriers, each spanning particular radio-frequency on which communications can flow wirelessly between the NB and WCDs. Each carrier could be frequency division duplex (FDD), defining separate frequency channels respectively for downlink and uplink communication, or time division duplex (TDD), with a single frequency channel multiplexed over time between downlink and uplink use.

On the downlink and uplink, each such carrier could be structured to define various air-interface resources and physical channels for carrying information between the NBs and WCDs. Without limitation, for instance, the downlink could be structured to define (i) a downlink shared channel with resources allocable by the NB for carrying data from the NB to WCDs and (ii) downlink control channels with resources for carrying control signaling from the NB to WCDs. And the uplink could be structured to define (i) an uplink shared channel with resources allocable by the NB for carrying data from WCDs to the NB and (ii) uplink control channels with resources for carrying control signaling from WCDs to the NB.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

Overview

A representative radio access technology may support carriers of various frequency bandwidths. For example, LTE supports carriers that have bandwidths of 1.4 MHz, 3 MHz, 5 MHz, 10 MHz, 15 MHz, and 20 MHz, among other possibilities, and 5G NR supports carriers of similar bandwidths as well as carriers of different and potentially much smaller or much wider bandwidths. An FDD carrier would define a pair of frequency channels, each having a respective bandwidth centered on a respective center frequency. And a TDD carrier would define a single frequency channel having a respective bandwidth centered on a respective center frequency.

A NB could be configured to provide service on one or more such carriers. To facilitate this, a wireless service provider that owns, operates, or controls the NB could acquire a license for radio frequency (RF) spectrum where appropriate and could configure the NB to operate on the carriers within that licensed spectrum. For instance, the service provider could configure the NB with one or more filters and/or other radio equipment to limit its communication to particular spectrum and could configure the NB to engage in downlink and uplink communication to define the carriers within that spectrum in accordance with an applicable radio access technology.

In a representative implementation, a NB could broadcast a synchronization signal at the center of each such carrier, and WCDs could scan for and discover the broadcast of that synchronization signal as an indication that the NB provides service on a carrier centered at that frequency. Further, the NB could broadcast on the carrier a master information block (MIB) or the like that specifies the bandwidth of the carrier centered on that frequency. Thus, a WCD that has discovered the synchronization signal could then read that MIB as way to determine the bandwidth of the carrier and thereby to determine the frequency range of the carrier as a range of frequency spectrum centered on the center frequency of the carrier and extending from a low-end frequency to a high-end frequency. The WCD could then engage in signaling to connect with and be served by the NB on the carrier.

For various reasons, however, a wireless service provider may face a scenario where a NB will provide service on a carrier of particular bandwidth and where the service provider would also like to have the NB provide service on another carrier of a narrower bandwidth, but without the need to license or otherwise add more spectrum for use to define that other carrier.

For example, the service provider might configure a NB to provide service on a 20-MHz TDD carrier, and the service provider may also want to configure the NB to provide service on a 180-kHz TDD carrier, without the need to license or otherwise add 180-kHz of spectrum for use by the NB. This situation could arise, for instance, if the service provider would like to have the NB provide service on the narrower-bandwidth carrier for a special class of WCDs, such as Class-M IoT (e.g., Machine-Type-Communication (MTC)) devices or narrowband IoT (nb-IoT) devices, without a need to add 180 kHz of spectrum to facilitate that service.

One way to address this scenario is to define the narrower-bandwidth carrier to be within the wider-bandwidth carrier's frequency range, with the wider-bandwidth carrier functioning as a host carrier and the narrower-bandwidth carrier functioning as a guest carrier. For instance, a NB could be configured to provide service on a 20-MHz carrier having a specific frequency range, and the NB could be additionally configured to provide service on a 180-kHz carrier whose frequency range sits somewhere within the frequency range of that 20-MHz carrier. Here, the wider-bandwidth carrier could be referred to as a wideband carrier and the narrower-bandwidth carrier could be referred to as a narrowband carrier.

With this arrangement, a portion of the wideband carrier's air-interface resources would also be air-interface resources of the narrowband carrier, but the NB could be configured to prioritize use of those resources for the narrowband carrier when needed or could otherwise manage the resources as between the two carriers.

In a representative implementation, the NB could specify in its MIB on the wideband carrier (i) the bandwidth of the wideband carrier and (ii) the center frequency and bandwidth of the narrowband carrier within the wideband carrier. When an IoT device or the like discovers coverage of the NB at the center frequency of the wideband carrier, the device could thus read the MIB and learn the location and bandwidth of the narrowband carrier and could connect with the NB on that narrowband carrier. Whereas, when a conventional (e.g., non-IoT) WCD discovers coverage of the NB at the center frequency of the wideband carrier, the WCD could read the MIB and learn the bandwidth of the wideband carrier and could connect with the NB on that wideband carrier.

In practice, a service provider may configure multiple NBs in a region to operate on the same wideband carrier as each other and to each operate on a narrowband carrier defined within the frequency range of that wideband carrier. For instance, the service provider may license spectrum that encompasses a given wideband carrier (e.g., a particular 20 MHz TDD carrier) and, based on that license, could configure multiple NBs in an area to provide service on that wideband carrier. Further, the service provider could define a narrowband carrier at a specific frequency position within that wideband carrier's frequency range and could configure each of the NBs to provide service on that narrowband carrier as well, for IoT devices or the like.

Unfortunately, however, certain IoT devices served by a NB on such a narrowband carrier could experience interference as a result of one or more other nearby NBs operating on the same narrowband carrier.

This could happen, for instance, where an IoT module is embedded in or otherwise provided with or as part of an aerial drone. Such an IoT module might connect with and be served by a single NB on a narrowband carrier. But if one or more other nearby NBs also provide service on the same narrowband carrier, transmissions from the nearby NB(s) on the narrowband carrier might result in RF interference at the IoT module when the drone is in flight. Such interference could be especially problematic for a drone, as it could lead to loss of communication and possible in-flight navigation issues.

One way to address this interference issue is by applying inter-cell interference cancellation (ICIC). With ICIC, a WCD that is served by a NB on a carrier could scan for and report to the NB when the NB detects threshold strong coverage from a nearby NB on the same carrier, and the serving NB and nearby NB could responsively engage in signaling with each other to coordinate their respective allocations of resources, agreeing that they will not transmit concurrently on the same frequency resources as each other on the carrier. Unfortunately, however, ICIC may not be desirable for an IoT device operating on a narrowband carrier, as the associated coverage-scanning and reporting could contribute to battery drain at the IoT device, and the limited bandwidth of the narrowband carrier might make it difficult for the NBs to adequately coordinate their non-concurrent use of the narrowband carrier's frequency resources.

Disclosed herein is a mechanism to help address this issue.

In accordance with the present disclosure, a plurality of NBs in a region will be configured to operate concurrently on the same wideband carrier as each other, and each of those NBs will also be configured to operate concurrently on a different narrowband carrier than each other as a respective guest carrier within that common wideband carrier. For instance, multiple NBs in a region could be configured to operate concurrently on the same 20-MHz wideband carrier as each other. And each of the NBs could also be configured to operate concurrently on a 180-kHz narrowband carrier defined within the frequency range of that 20-MHz wideband carrier, but each NB's 180-kHz narrowband carrier could be configured at a different respective frequency position within the 20-MHz wideband carrier than each other NB's 180-kHz narrowband carrier.

Having the NBs operate on the same wideband carrier as each other can be beneficial from a licensing perspective, as the service provider can make use of the same licensed spectrum at each of the NBs. And having the NBs operate on different respective narrowband carriers than each other within that common wideband carrier can help avoid interference issues for IoT devices or the like that may be served on such narrowband carriers.

In an example implementation, the NBs could be so configured in advance, rather than dynamically in response to detected interference. That is, the NBs could be pre-configured to operate on the common wideband carrier and to operate on their own respective narrowband carriers within that common wideband carrier.

Further, the configuration of these NBs to operate on different narrowband carriers than each other within the NBs' common wideband carrier could optimally be based on the differences in frequency between those narrowband carriers. In particular, of the NBs that would be configured operate on the common wideband carrier, each such NB could be further configured to operate within the common wideband carrier on a respective narrowband carrier that is selected based on that narrowband carrier being different than and non-overlapping in frequency with the narrowband carrier on which each other of the NBs would be configured to operate within the common wideband carrier.

In addition, to help further reduce the possibility of interference experienced by IoT devices or the like, each such NB could also be configured to avoid scheduling communications on resources of the wideband carrier that overlap (partly or fully) in frequency with the narrowband carrier(s) on which the other NB(s) operates within the common wideband carrier. Thus, when the NB is going to allocate resources for carrying communications on the wideband carrier, the NB could select the resources based on the resources not overlapping in frequency with the narrowband carrier(s) on which the other NB(s) operate within the common wideband carrier. To facilitate this, the NBs could be configured with information indicating each other's respective narrowband carrier within the common wideband carrier, or the NBs could share such information via inter-NB communication interfaces or the like.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE or 5G NR. However, it will be understood that principles of the disclosure can extend to apply in other scenarios as well, such as with respect to other air interface protocols. Further, even within the context of LTE or 5G NR, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
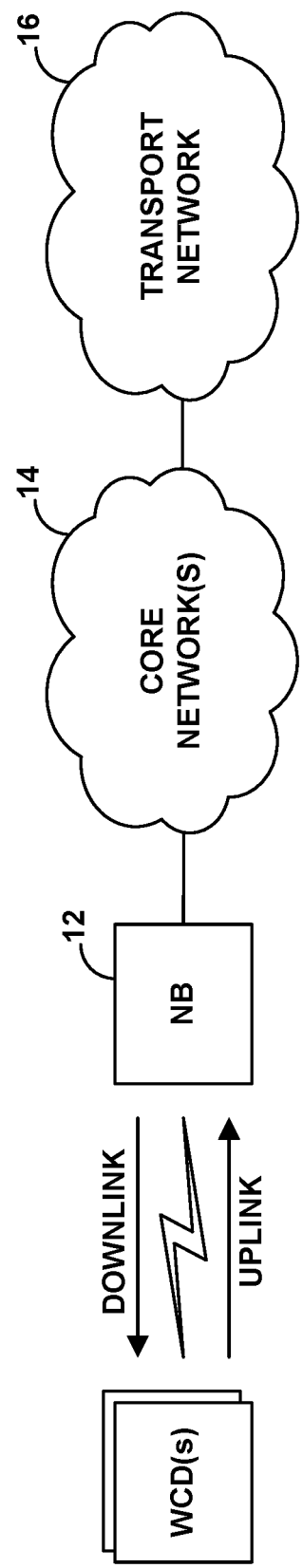
FIG. 1 is a simplified block diagram of an example network.

Referring to the drawings, as noted above, FIG. 1 is a simplified block diagram of an example network. This network functions primarily to serve WCDs with wireless packet data communication service, including possibly voice-over-packet service, but may also provide other functions. As shown, the network includes a representative NB 12, which would have an antenna structure and associated equipment (e.g., baseband unit, radio, and amplifier) for providing respective coverage in which to serve WCDs. This NB could take any of a variety of forms, such as a macro NB, a small cell NB, and/or a relay NB, among other possibilities. Likewise, the WCDs could take various forms, such as any of those noted above for instance.

As further shown, the NB has a communication interface with one or more core networks 14 each operated by a service provider or operator and defining a respective public land mobile network (PLMN), and each of which may provide connectivity with a transport network 16 such as the Internet. In a representative implementation, each core network could include one or more gateways to provide bearer connectivity between served WCDs and the transport network 16, as well as one or more control entities to control setup of bearers and other core-network operations.

As noted above, a representative NB may provide service on one or more carriers, each defining a downlink and an uplink. For instance, the NB could provide service on an FDD carrier that defines separate downlink and uplink frequency channels and/or on a TDD carrier that defines a frequency channel time division multiplexed between downlink and uplink use. Each carrier (e.g., carrier channel) could be characterized by its bandwidth and center frequency, thus defining a frequency range that extends from a low-frequency end to a high-frequency end.

In an example implementation, the air interface on the carrier could be subdivided in the time domain and the frequency domain to define an array of resource elements for carrying modulated communications between the NB and WCDs. For instance, in the time domain, the air interface could define a continuum of 10-millisecond (ms) frames, each divided into ten 1-ms subframes, and each subframe could be further divided into a number of timeslots, each further divided into symbol time segments. And in the frequency domain, the carrier bandwidth could be divided into subcarriers with specified subcarrier spacing on the order of 15 to 240 kHz. With this arrangement, the air interface on the carrier would define an array of resource elements each occupying a subcarrier and symbol time segment, and the base station and WCDs could communicate with each other through modulation of the subcarriers to carry data in those resource elements. Variations of this arrangement may be possible as well.

Further, particular groupings of resource elements could define physical resource blocks (PRBs). In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives from the NB to WCDs. And other resource elements per subframe could be reserved to define a shared channel in which PRBs could carry scheduled data communications from the NB to WCDs. When the NB is serving a WCD and has data to transmit to the WCD, the NB could select downlink PRBs in a subframe to carry the data to the WCD. And the NB could transmit to the WCD in the control region of that subframe a scheduling directive designating the PRBs that carry the data and could accordingly transmit the data to the WCD in those designated PRBs.

Further, in certain subframes, a group of resource elements centered on the center frequency of the carrier could be reserved to carry synchronization signals that WCDs could scan for and discover as a way to detect coverage of the NB on the carrier and to establish frame timing. And, in certain subframes, a group of resource elements also centered on the center frequency of the carrier could be reserved to define a broadcast-channel for carrying system information messages, such as MIB and system information block (SIB) messages that WCDs could read to obtain operational parameters such as carrier bandwidth and other information. Further, certain resource elements distributed in a predefined pattern throughout the carrier bandwidth per subframe could be reserved to carry a cell-specific reference signal that WCDs could measure as a basis to evaluate coverage strength and quality.

On the uplink, on the other hand, certain resource elements per subframe (or per uplink subframe in TDD) could likewise be reserved to define an uplink control region for carrying control signaling such as scheduling requests from WCDs to the NB. And other resource elements per subframe could be reserved to define a shared channel in which PRBs could carry scheduled data communications from WCDs to the NB. When the NB is serving a WCD and the WCD has data to transmit to the NB, the WCD could send a scheduling request to the NB. And the NB could then select uplink PRBs in a subframe to carry the data from the WCD and could send to the WCD a scheduling directive designating the PRBs, and the WCD could accordingly transmit the data to the NB in the designated PRBs. Further, other resources on the uplink could be reserved for other purposes as well.

In operation, when a WCD enters into coverage of a NB on such a carrier, the WCD could detect the NB's synchronization signal and could then read the NB's MIB or the like to determine the carrier's bandwidth. The WCD could then engage in random access signaling and Radio Resource Control (RRC) configuration signaling with the NB to connect with the NB on the carrier. And the NB could then serve the WCD with data communications as noted above.

In practice, a NB could be configured to operate on such a carrier by being configured with one or more filters and other radio equipment keyed to the carrier's frequency range, and by being programmed to engage in and support downlink and uplink communication on channels of the carrier as described above or otherwise in accordance with an applicable radio access technology. For example, engineers of a wireless service provider could so configure the NB and/or the NB could be automatically configured.

As noted above, a NB that is configured to operate on such a carrier could further be configured to operate on a guest carrier defined within the carrier. For instance, NB could be configured to operate on a wideband carrier and could further be configured to operate on a narrowband carrier defined within the frequency range of the wideband carrier.

Figure 2:
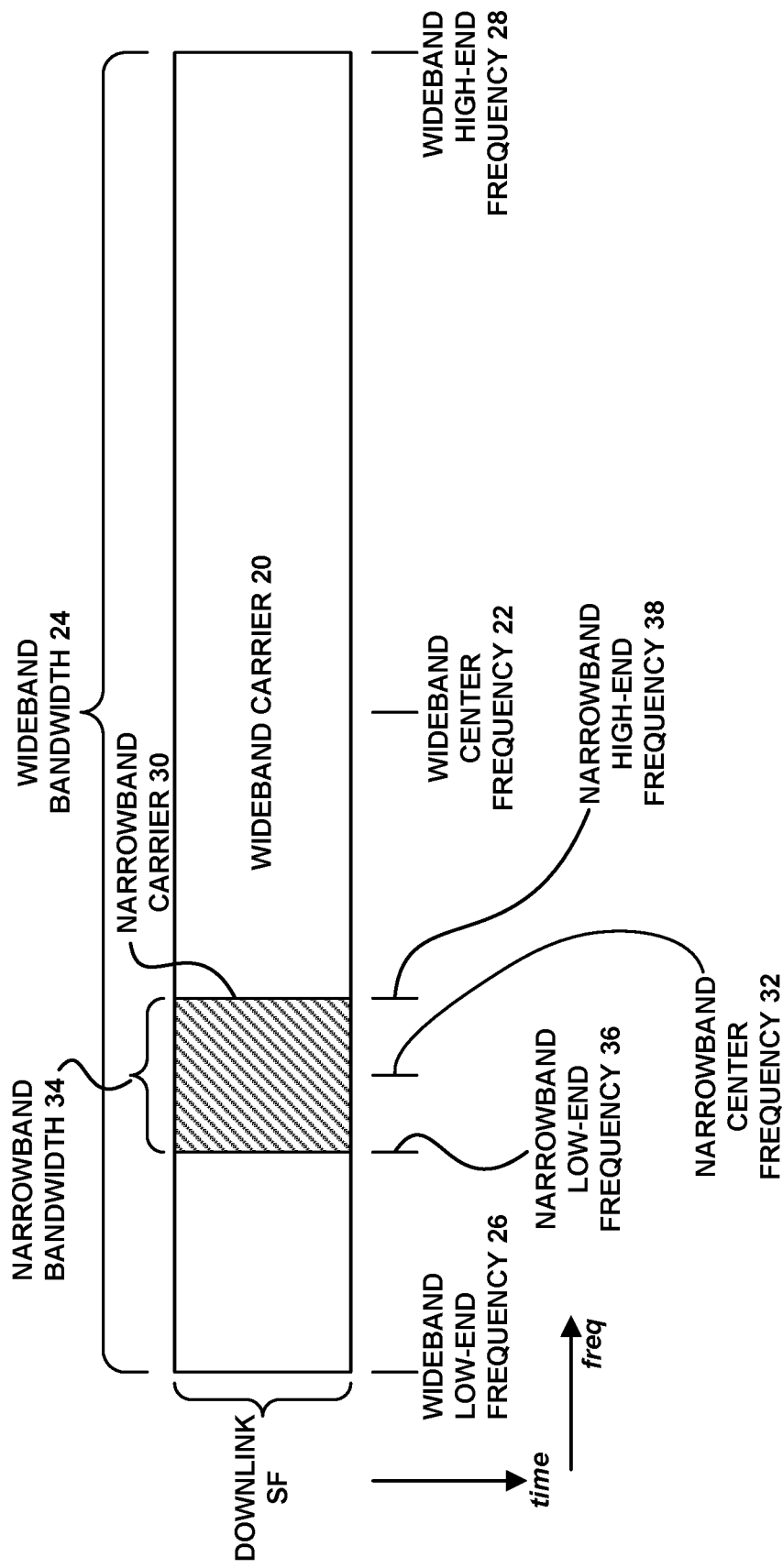
FIG. 2 is an illustration of an example wideband host carrier and an example narrowband guest carrier.

FIG. 2 illustrates this arrangement by way of example. In particular, FIG. 2 shows an example wideband carrier 20, having a center frequency 22 and bandwidth 24 that cooperatively define a frequency range that extends from a low-end frequency 26 of the carrier to a high-end frequency 28 of the carrier. FIG. 2 depicts a representative downlink subframe of the wideband carrier.

In an example implementation, a NB configured to operate on this wideband carrier could broadcast a synchronization signal to enable WCDs to discover coverage on the carrier and could further broadcast a MIB that specifies the bandwidth 22 of the carrier. Thus, a WCD could discover coverage of the NB on the carrier and, by reading the MIB, could discover the bandwidth of the carrier, and the WCD could then connect with and be served by the NB on the carrier.

Further, FIG. 2 shows a guest narrowband carrier 30 defined within the frequency range of the wideband carrier 20. In particular, the narrowband carrier 30 has a center frequency 32 and bandwidth 34 that cooperatively define a frequency range that extends from a low-end frequency 36 of the narrowband carrier to a high-end frequency 38 of the narrowband carrier. As shown, the frequency range of the narrowband carrier is narrower than the frequency range of the wideband carrier and is fully encompassed by the frequency range of the wideband carrier.

In an example implementation, the NB configured to operate on the wideband host carrier and the narrowband guest carrier could advertise the existence of the narrowband carrier by specifying, in the MIB that the NB broadcasts on the wideband carrier, the narrowband carrier's frequency position and bandwidth. Thus, a WCD that discovers coverage of the NB on the wideband carrier and reads the NB's MIB could learn that the NB also provides service on the narrowband carrier. And if appropriate, the WCD could then connect with and be served with the NB on the narrowband carrier.

In practice, the wideband carrier 20 and narrowband carrier 30 could each be structured to include the physical channels prescribed by an applicable radio access technology (the same technology or different technologies on the two carriers). For instance, each carrier could define its own shared channel and its own control channels. Further, because the narrowband carrier will occupy a portion of the wideband carrier's frequency range, the narrowband carrier and NB could be configured in a manner that helps avoid or minimize conflict between the two carriers but that allows the carriers to share use of certain resources. For example, the narrowband carrier could be defined within the wideband carrier at a frequency position that is selected to avoid overlap of certain key wideband-carrier control channels with corresponding key narrowband-carrier control channels but that allows overlap of one or more other particular control channels such as reference-signal channels or the like.

As indicated above, the NB might provide service on the narrowband carrier specifically for one or more designated classes of WCDs. For instance, the NB might provide service on the narrowband carrier for Cat-M IoT devices or nb-IoT devices. Whereas, the NB might provide service on the wideband carrier for other devices, such as conventional or non-IoT devices. To facilitate this, the NB could include in its MIB an indication on a per WCD-class basis of whether a WCD should connect with and be served by the NB on the wideband carrier or rather on the narrowband carrier. Once a WCD reads the MIB, the WCD could thus decide whether to connect with and be served by the NB on the wideband carrier or rather to connect with and be served by the NB on the narrowband carrier, and the WCD could proceed accordingly.

Alternatively, the NB might broadcast a synchronization signal and/or other signal within the narrowband carrier, and certain WCDs such as IoT devices or the like could be configured to search for coverage of the narrowband carrier initially and to connect with and be served by the NB on the narrowband carrier.

As further discussed above, the present disclosure addresses a scenario where multiple NBs in a region would operate on the same wideband carrier as each other and the NBs would also each be configured to operate on a narrowband guest carrier within that wideband carrier. In practice, each such NB might operate on more than one narrowband guest carrier within the common wideband carrier. But for simplicity, this discussion will address a scenario where each NB will operate on a representative narrowband carrier within the common wideband carrier.

As explained above, to help avoid certain interference issues that could arise from such NBs operating on the same narrowband guest carrier as each other within the common wideband carrier, the NBs could be pre-configured to operate on different respective narrowband guest carriers than each other. In particular, multiple discrete narrowband carriers could be defined within the common wideband carrier, and each of the NBs could be configured to operate on a respective one of those narrowband carriers, selected based on the narrowband carrier being different than the narrowband carrier(s) on which the other NB(s) are or would be configured to operate. Further, to help further prevent interference, each NB could also be configured to avoid allocating air interface resources of the common wideband carrier that would overlap in frequency with the narrowband carrier on which any of the other NBs is configured to operate.

The group of NBs at issue here could be NBs whose RF transmissions on the wideband carrier could extend to a common position where an IoT device or the like could operate. For instance, at issue could be those NBs whose RF transmissions on the wideband carrier may extend into the air where an aerial-drone based IoT device might operate. These NBs might be tier-1 neighbors of each other, or they may be more distant from each other. Further, the selection of which NBs to include in the group could be made by engineering input and/or automated evaluation.

Figure 3:
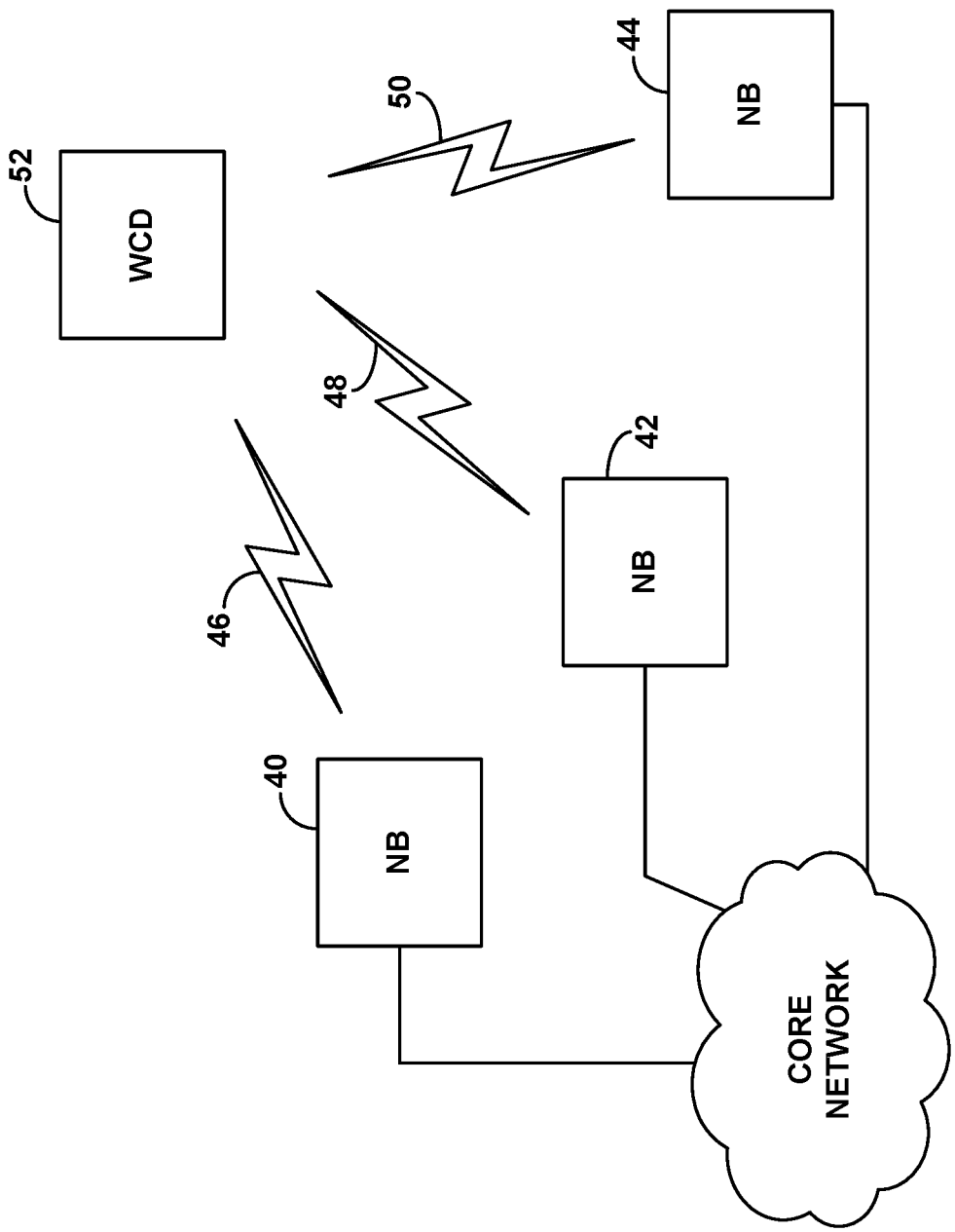
FIG. 3 is a simplified block diagram of an arrangement in which multiple NBs provide respective coverage and a representative WCD is in range of all of the NBs.

FIG. 3 is a simplified block diagram depicting an arrangement in which three example NBs 40, 42, 44 provide respective coverage 46, 48, 50, and where a representative WCD 52 is positioned within RF range of all three NBs. WCD 52 could be a Cat-M IoT or nb-IoT device operating as a communication module within an aerial drone, to facilitate cellular-based communication with a handheld-controller operated at ground level by a user. Other examples are possible as well. Further, each NB may also serve a number of other WCDs, such as conventional or non-IoT devices.

In this arrangement, all three NBs 40, 42, 44 could be configured to operate, concurrently with each other (e.g., with synchronized frame timing), on the common wideband carrier. Further, each NB could also be configured to operate on a separate respective narrowband carrier defined within the frequency range of that common wideband carrier, and to avoid allocating resources on the wideband carrier that would overlap with the narrowband carrier on which any of the other NBs is configured to operate.

Figure 4:
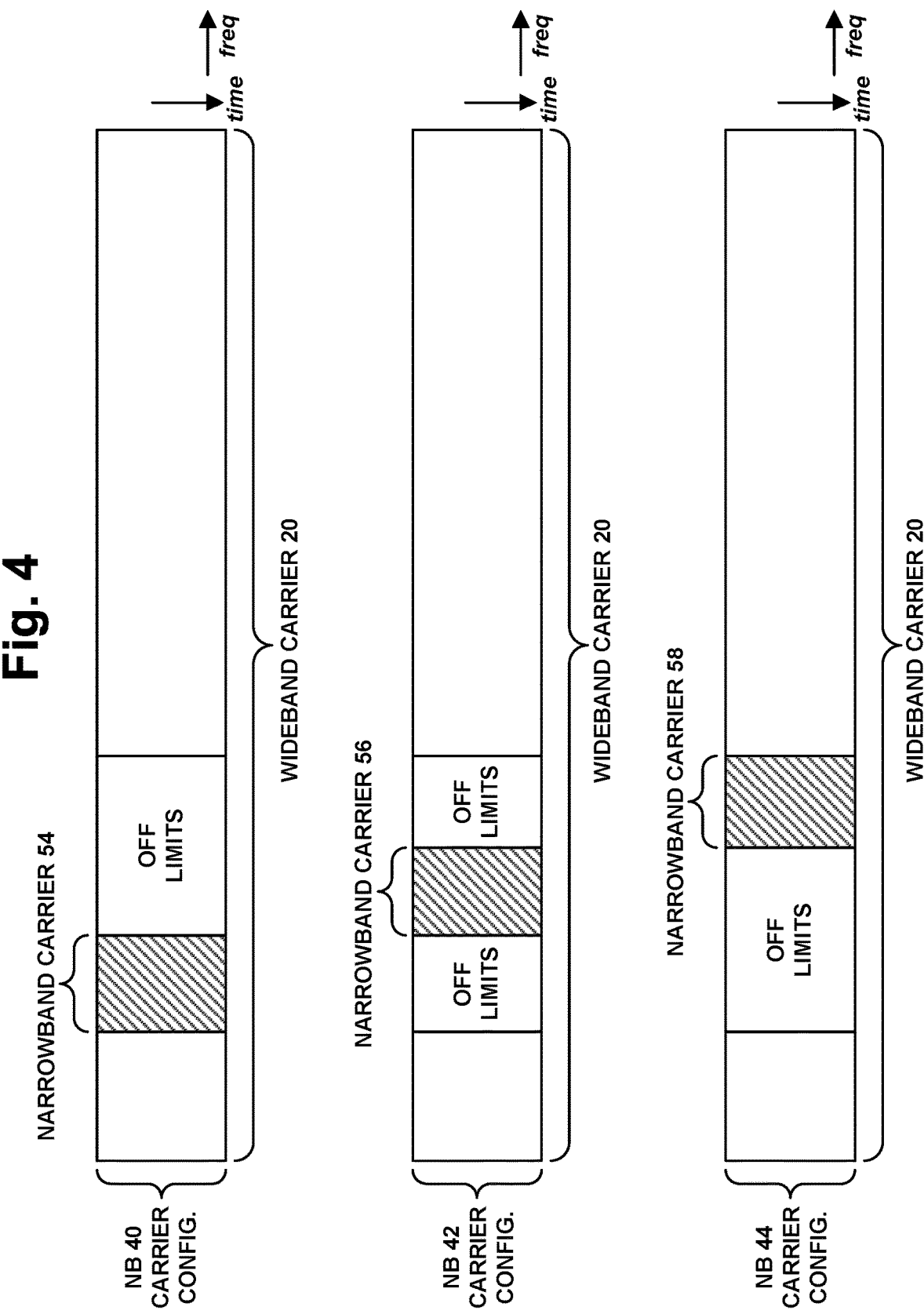
FIG. 4 is an illustration of carrier configurations of the NBs of FIG. 3, with each having a different respective narrowband carrier defined within the frequency range of a common wideband carrier.

FIG. 4 illustrates these carrier configurations by way of example as variations of the configuration shown in FIG. 2. In particular, FIG. 4 shows an example downlink subframe respectively for each of the three NBs of FIG. 3. As shown, each NB operates on the wideband carrier 20, which has center frequency 22 and bandwidth 24 (perhaps 20 MHz). Further, NB 40 is configured to operate on a narrowband carrier 54 that has a respective center frequency and bandwidth; NB 42 is configured to operate on a narrowband carrier 56 that has a respective center frequency and bandwidth; and NB 44 is configured to operate on a narrowband carrier 58 that has a respective center frequency and bandwidth.

In configuring NBs 40, 42, 44 to operate on these respective narrowband carriers within the common wideband carrier, the narrowband carrier (e.g., center frequency and bandwidth) on which each NB is configured to operate could be selected intentionally so that the narrowband carrier does not overlap in frequency with the narrowband carriers on which the other two NBs of the example group are or will be configured to operate. For instance, engineers configuring each NB could select the narrowband carrier for use by the NB based on the selected carrier not overlapping in frequency with the narrowband carriers that the other NBs are or will be configured to use. Thus, the narrowband carriers could span mutually exclusive ranges of frequency.

With the narrowband carriers configured to not overlap with each other in frequency, WCD 52 could be served by one of the NBs on the NB's respective narrowband carrier without receiving interference (or with substantially reduced interference) from the other NBs' transmissions on their respective narrowband carriers.

Further, each NB could also be configured so that, in providing service on the wideband carrier, the NB would avoid allocation of resources that would overlap in frequency with the narrowband carriers on which the other two NBs are configured to operate within the wideband carrier. As shown in FIG. 4, for instance, NB 40 could be configured to treat as off-limits the air interface resources that overlap or coincide in frequency with narrowband carriers 56 and 58; NB 42 could be configured to treat as off-limits the air interface resources that overlap or coincide in frequency with narrowband carriers 54 and 58; and NB 44 could be configured to treat as off-limits the air interface resources that overlap in frequency with narrowband carriers 54 and 56. With this arrangement, each NB could still engage in other communications, such as reference-signal transmission, on frequency resources that are within the frequency ranges of the other NBs' respective narrowband carriers. But each NB could forgo scheduling of communications (e.g., shared-channel PRB communications such as bearer communications) on within those frequency ranges.

Note also that this configuration of the NBs could establish the center frequency and bandwidth of each NB's respective narrowband carrier within the common wideband carrier and could establish that each NB will provide service on its defined narrowband carrier while also providing service on the common wideband carrier. However, it is possible that such a NB might not constantly operate on its defined narrowband carrier. In an example implementation, a NB might dynamically initiate operation on its respective narrowband carrier (e.g., beginning to advertise the narrowband carrier's presence and allow WCD connections on the narrowband carrier) in response to a service request from an IoT or other such device that the NB would serve on the narrowband carrier. Alternatively, the NB could regularly operate on both the common wideband carrier and the NB's respective narrowband carrier.

Accordingly, in one respect, the present disclosure contemplates a wireless communication system that includes a plurality of base stations. Each base station could comprise a respective antenna structure through which the base station is configured to wirelessly transmit and receive. Further, each base station could be configured to operate, concurrently with each other base station of the plurality, on a common wideband carrier. And each base station could be configured to operate, concurrently with each other base station of the plurality, on a respective narrowband carrier that is narrower than and fully encompassed by the common wideband carrier and that is selected based on the respective narrowband carrier being different from and non-overlapping with the respective narrowband carrier on which each other base station of the plurality is configured to operate.

In line with the discussion above, for instance, the common wideband carrier could have a center frequency and bandwidth that cooperatively define a frequency range of the common wideband carrier, and the respective narrowband carrier on which each base station is configured to operate could have a center frequency and bandwidth that cooperatively define a frequency range of the respective narrowband carrier. In that case, the respective frequency range of the respective narrowband carrier on which each base station is configured to operate could be narrower than and fully encompassed by the frequency range of the common wideband carrier and could be different from and non-overlapping with the respective frequency range of the respective narrowband carrier on which each other base station of the plurality of base stations is configured to operate.

Further, each base station could be configured to broadcast a synchronization signal centered at the center frequency of the common wideband carrier and to broadcast on the common wideband carrier an information message that specifies the bandwidth of the common wideband carrier. And each base station could be configured to specify in the information message the center frequency and bandwidth of the respective narrowband carrier on which the base station is configured to operate.

In addition, as discussed above, each base station could be configured to indicate, in the information message that the base station broadcasts on the common wideband carrier, (i) that the common wideband carrier is for use by a first class of client devices to be served by the base station and (ii) that the respective narrowband carrier on which the base station is configured to operate is for use by a second class of devices to be served by the base station. For instance, the second class could be IoT devices (e.g., including aerial IoT devices such as those provided in aerial drones) and the first class could be non-IoT device.

Further, the common wideband carrier could be divided over frequency into air-interface resources, and each base station of the plurality could be configured to selectively allocate the air-interface resources for use to carry air-interface communications. And each base station of the plurality could be further configured to respectively select a set of the air-interface resources to allocate based on the selected set of air-interface resources not overlapping in frequency with the respective frequency range of the respective narrowband carrier on which each other base station of the plurality is configured to operate.

In another aspect, the present disclosure contemplates one or more such base stations, each configured accordingly to operate on the common wideband carrier, each configured to operate on a narrowband guest carrier selected based on the narrowband guest carrier not overlapping in frequency with narrowband guest carrier(s) on which one or more other base stations are or will be configured to operate within the wideband carrier.

Further, the disclosure contemplates a method of configuring one or more such base stations. For instance, the method could include configuring each base station to operate, concurrently with each other base station of a plurality, on a common wideband carrier. And the method could include configuring each base station to operate, concurrently with each other base station of the plurality, on a respective narrowband carrier that is narrower than and encompassed fully by the common wideband carrier and that is selected based on the respective narrowband carrier being different from and non-overlapping with the respective narrowband carrier on which each other base station of the plurality is configured to operate.

As noted above, this configuration process could be done manually and/or automatically. Further, other features described above could be incorporated in this context, and vice versa. For instance, the method could involve configuring each base station to broadcast on the common wideband carrier a synchronization signal and an information message that specifies the common wideband carrier's bandwidth, configuring each base station to specify in the information message the center frequency and bandwidth of the respective narrowband carrier, and configuring each base station to select air-interface resources for allocation on the wideband carrier based on the selected air-interface resources not overlapping in frequency with the respective frequency range of the respective narrowband carrier that each other base station is configured to operate. Other examples are possible as well.

Still further, the present disclosure contemplates a method that includes each such base station operating, concurrently with each other, on the common wideband carrier and operating, concurrently with each other, on a respective narrowband carrier that is narrower than and encompassed fully by the common wideband carrier and that is selected based on the respective narrowband carrier being different from and non-overlapping with the respective narrowband carrier on which each other base station of the plurality operates. And here too, other features described above could be incorporated in this context and vice versa.

Figure 5:
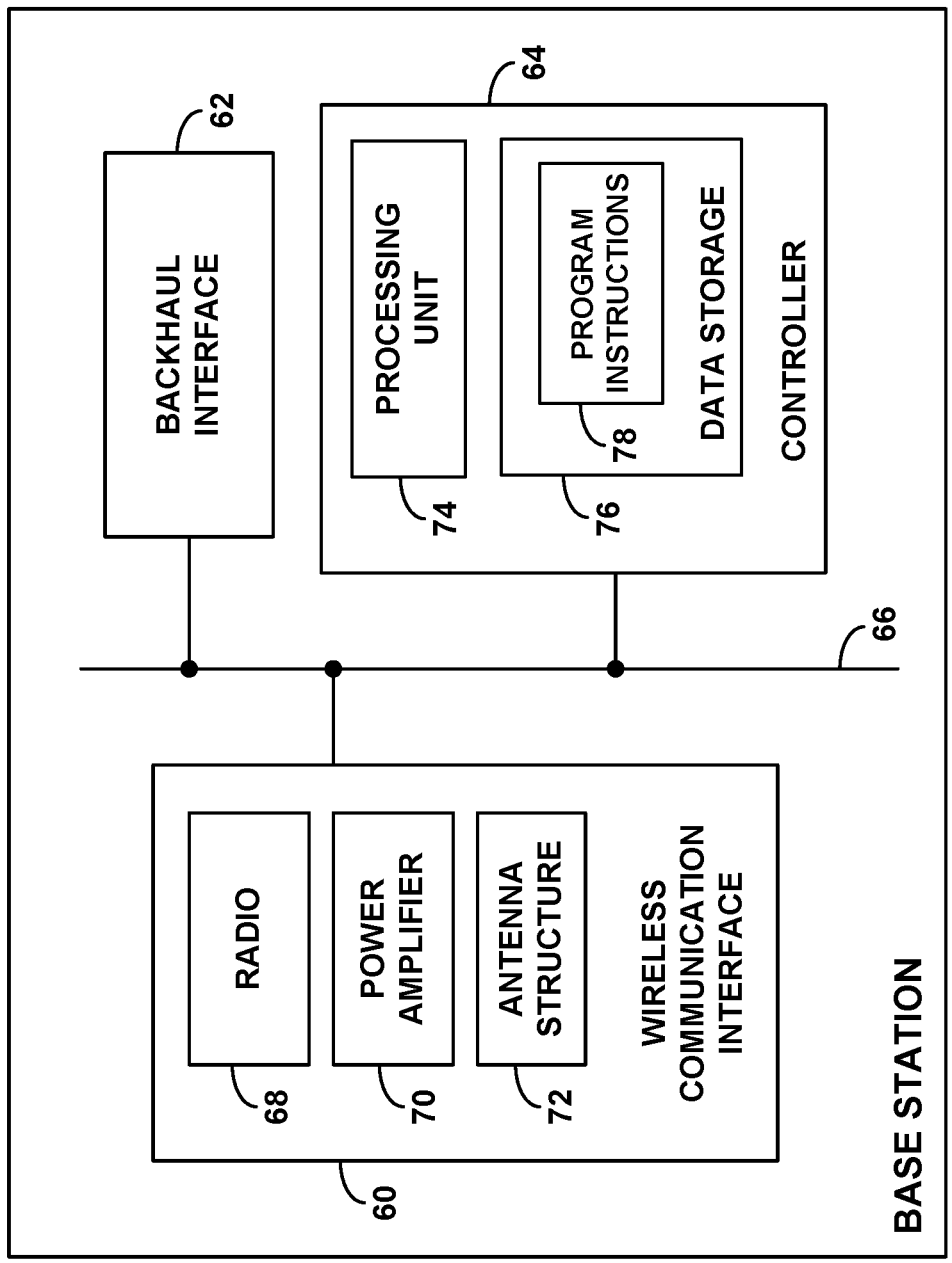
FIG. 5 is a simplified block diagram of a base station that could be configured to operate in accordance with the disclosure.

Finally, FIG. 5 is a simplified block diagram of an example base station that could be configured to operate as described above. As shown in FIG. 5, the base station includes a wireless communication interface 60, a backhaul interface 62, and a controller 64, all of which could be integrated together in various ways or interconnected by a system bus, network, or other connection mechanism 66.

The wireless communication interface 60 could include a radio 68, a power amplifier 70, and an antenna structure 72, cooperatively enabling the base station to transmit and receive as described above. And the backhaul interface 62 could comprise a network port through which the base station could be interconnected with other network entities, such as entities of one or more core networks.

Controller 64 could then comprise a processing unit 74 (e.g., one or more microprocessors), non-transitory data storage 76 (e.g., one or more volatile and/or non-volatile storage components), and program instructions 78 (e.g., machine language instructions) stored in the data storage 76 and executable by the processing unit 74 to carry out various base station operations described herein. Further, non-transitory data storage 76 could hold data characterizing the respective narrowband carrier(s) on which one or more other base stations operate within a common wideband carrier, so that the example base station could forgo assignment of air-interface resources that overlap in frequency with such narrowband carrier(s).

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A wireless communication system comprising a plurality of base stations, wherein each base station comprises a respective antenna structure through which the base station is configured to wirelessly transmit and receive, each base station of the plurality being configured to operate, concurrently with each other base station of the plurality, on a common wideband carrier, and each base station of the plurality being configured to operate on a different respective narrowband carrier than each other base station of the plurality is concurrently configured to operate on, wherein, for each base station of the plurality, the respective narrowband carrier on which the base station is configured to operate is narrower than and fully encompassed by the common wideband carrier and is selected based on the respective narrowband carrier being different from and non-overlapping with the respective narrowband carrier on which each other base station of the plurality is configured to operate.

2. The wireless communication system of claim 1,
wherein the common wideband carrier has a center frequency and bandwidth that cooperatively define a frequency range of the common wideband carrier,
wherein the respective narrowband carrier on which each base station is configured to operate has a center frequency and bandwidth that cooperatively define a frequency range of the respective narrowband carrier, and
wherein the respective frequency range of the respective narrowband carrier on which each base station is configured to operate is narrower than and fully encompassed by the frequency range of the common wideband carrier and is different from and non-overlapping with the respective frequency range of the respective narrowband carrier on which each other base station of the plurality of base stations is configured to operate.

3. The wireless communication system of claim 2,
wherein each base station is configured to broadcast a synchronization signal centered at the center frequency of the common wideband carrier and to broadcast on the common wideband carrier an information message that specifies the bandwidth of the common wideband carrier, and
wherein each base station is configured to specify in the information message the center frequency and bandwidth of the respective narrowband carrier on which the base station is configured to operate.

4. The wireless communication system of claim 3, wherein each base station is configured to indicate, in the information message that the base station broadcasts on the common wideband carrier, (i) that the common wideband carrier is for use by a first class of client devices to be served by the base station and (ii) that the respective narrowband carrier on which the base station is configured to operate is for use by a second class of devices to be served by the base station, the second class being different than the first class.

5. The wireless communication system of claim 4, wherein the second class of devices is Internet-of-Thing (IoT) devices, and wherein the first class of devices is non-IoT devices.

6. The wireless communication system of claim 5, wherein the IoT devices comprise aerial IoT devices.

7. The wireless communication system of claim 1, wherein the common wideband carrier is divided over frequency into air-interface resources, and wherein each base station of the plurality is configured to selectively allocate the air-interface resources for use to carry air-interface communications,
wherein each base station of the plurality is further configured to respectively select a set of the air-interface resources to allocate based on the selected set of air-interface resources not overlapping in frequency with the respective frequency range of the respective narrowband carrier on which each other base station of the plurality is configured to operate.

8. A method for configuring service of a plurality of base stations in a region, the method comprising:
configuring each base station of the plurality to operate, concurrently with each other base station of the plurality, on a common wideband carrier; and
configuring each base station of the plurality to operate on a different respective narrowband carrier than each other base station of the plurality is concurrently configured to operate on, wherein, for each base station of the plurality, the respective narrowband carrier on which the base station is configured to operate is narrower than and fully encompassed by the common wideband carrier and is selected based on the respective narrowband carrier being different from and non-overlapping with the respective narrowband carrier on which each other base station of the plurality is configured to operate.

9. The method of claim 8,
wherein the common wideband carrier has a center frequency and bandwidth that cooperatively define a frequency range of the common wideband carrier,
wherein the respective narrowband carrier on which each base station is configured to operate has a center frequency and bandwidth that cooperatively define a frequency range of the respective narrowband carrier, and
wherein the respective frequency range of the respective narrowband carrier on which each base station is configured to operate is narrower than and fully encompassed by the frequency range of the common wideband carrier and is different from and non-overlapping with the respective frequency range of the respective narrowband carrier on which each other base station of the plurality of base stations is configured to operate.

10. The method of claim 9,
wherein configuring each base station to operate on the common wideband carrier comprises configuring each base station to broadcast a synchronization signal centered at the center frequency of the common wideband carrier and to broadcast on the common wideband carrier an information message that specifies the bandwidth of the common wideband carrier, and
wherein configuring each base station to operate on the respective narrowband carrier comprises configuring each base station to specify in the information message the center frequency and bandwidth of the respective narrowband carrier.

11. The method of claim 10, further comprising configuring each base station to indicate, in the information message that the base station broadcasts on the common wideband carrier, (i) that the common wideband carrier is for use by a first class of client devices to be served by the base station and (ii) that the respective narrowband carrier on which the base station is configured to operate is for use by a second class of devices to be served by the base station, the second class being different than the first class.

12. The method of claim 11, wherein the second class of devices is Internet-of-Thing (IoT) devices, and wherein the first class of devices is non-IoT devices.

13. The method of claim 12, wherein the IoT devices comprise aerial IoT devices.

14. The method of claim 8, wherein the common wideband carrier is divided over frequency into air-interface resources, and wherein each base station of the plurality is configured to selectively allocate the air-interface resources for use to carry air-interface communications,
the method further comprising configuring each base station of the plurality to respectively select a set of the air-interface resources to allocate based on the selected set of air-interface resources not overlapping in frequency with the respective frequency range of the respective narrowband carrier on which each other base station of the plurality is configured to operate.

15. A method comprising:
operating, by each base station of a plurality of base stations, concurrently with each, on a common wideband carrier; and
further operating, by each of the base stations on a different respective narrowband carrier than each other base station of the plurality operates on, wherein, for each base station of the plurality, the respective narrowband carrier on which the base station operates is narrower than and fully encompassed by the common wideband carrier and is selected based on the respective narrowband carrier being different from and non-overlapping with the respective narrowband carrier on which each other base station of the plurality operates.

16. The method of claim 15,
wherein the common wideband carrier has a center frequency and bandwidth that cooperatively define a frequency range of the common wideband carrier,
wherein the respective narrowband carrier on which each base station operates has a center frequency and bandwidth that cooperatively define a frequency range of the respective narrowband carrier, and
wherein the respective frequency range of the respective narrowband carrier on which each base station operates is narrower than and fully encompassed by the frequency range of the common wideband carrier and is different from and non-overlapping with the respective frequency range of the respective narrowband carrier on which each other base station of the plurality of base stations operates.

17. The method of claim 16,
wherein operating, by each of the base stations, on the common wideband carrier comprises the base station broadcasting a synchronization signal centered at the center frequency of the common wideband carrier and broadcasting on the common wideband carrier an information message that specifies the bandwidth of the common wideband carrier, and
wherein operating, by each of the base stations, on the respective narrowband carrier comprises the base station specifying in the information message the center frequency and bandwidth of the respective narrowband carrier.

18. The method of claim 17, further comprising each base station indicating, in the information message that the base station broadcasts on the common wideband carrier, (i) that the common wideband carrier is for use by a first class of client devices to be served by the base station and (ii) that the respective narrowband carrier on which the base station is configured to operate is for use by a second class of devices to be served by the base station, the second class being different than the first class.

19. The method of claim 18, wherein the second class of devices is Internet-of-Thing (IoT) devices, and wherein the first class of devices is non-IoT devices.

20. The method of claim 15, wherein the common wideband carrier is divided over frequency into air-interface resources, and wherein each base station of the plurality is configured to selectively allocate the air-interface resources for use to carry air-interface communications,
the method further comprising each base station of the plurality respectively selecting a set of the air-interface resources to allocate based on the selected set of air-interface resources not overlapping in frequency with the respective frequency range of the respective narrowband carrier on which each other base station of the plurality operates.

* * * * *